United States Patent [19]
Dent et al.

[11] Patent Number: 5,896,375
[45] Date of Patent: Apr. 20, 1999

[54] SHORT-RANGE RADIO COMMUNICATIONS SYSTEM AND METHOD OF USE

[75] Inventors: Paul W. Dent, Pittsboro, N.C.; Jacobus Cornelis Haartsen, Staffanftorp, Sweden

[73] Assignee: Ericsson Inc., Research Triangle Park, N.C.

[21] Appl. No.: 08/685,069

[22] Filed: Jul. 23, 1996

[51] Int. Cl.$^6$ ........................................... H04J 3/16
[52] U.S. Cl. ........................................... 370/347; 370/442
[58] Field of Search ........................... 370/310, 312, 370/314, 321, 324, 326, 329, 337, 341, 346, 347, 350, 216, 237, 319, 330, 332, 333, 344, 343, 349, 389, 468, 475, 477, 478, 480, 442, 276, 280, 281, 294, 295, 297, 296, 503; 379/58–60, 95, 96, 97, 98; 375/200; 395/181

[56] References Cited

U.S. PATENT DOCUMENTS

| | | | |
|---|---|---|---|
| 4,398,062 | 8/1983 | McRae et al. | 375/235 |
| 4,817,089 | 3/1989 | Paneth et al. | 370/347 |
| 4,958,341 | 9/1990 | Hemmady et al. | 370/352 |
| 5,180,993 | 1/1993 | Dent | 331/16 |
| 5,235,595 | 8/1993 | O'Dowd | 370/392 |
| 5,241,702 | 8/1993 | Dent | 455/278.1 |
| 5,295,140 | 3/1994 | Crisler et al. | 370/94.1 |
| 5,446,739 | 8/1995 | Nakano et al. | 370/337 |
| 5,506,848 | 4/1996 | Drakopoulos et al. | 370/95.1 |
| 5,521,925 | 5/1996 | Merakos et al. | 370/95.3 |

FOREIGN PATENT DOCUMENTS

| | | |
|---|---|---|
| 0595637 | 10/1993 | European Pat. Off. |
| 0677930 | 4/1995 | European Pat. Off. |

*Primary Examiner*—Dang Ton
*Attorney, Agent, or Firm*—Jenkens & Gilchrist, P.C.

[57] ABSTRACT

A short-range wireless radio communications system is provided that can carry data, voice, or data and voice traffic simultaneously. The band is divided into a plurality of channels or hops, and a burst composed of either voice information, data information, or a combination of data and voice information is transmitted during one of the hops. The system operates preferably in a simplex mode, but full duplex operation can also be employed. The present system can also be operated in a cellular, TDMA system. A multiple time slot method is employed whereby one time slot can carry data and another time slot can carry voice information.

29 Claims, 6 Drawing Sheets

SHORT-RANGE RADIO COMMUNICATIONS SYSTEM AND METHOD OF USE

BACKGROUND OF THE INVENTION

1. Field of the Invention

The present invention relates generally to the field of wireless communications and, in particular, to a short-range wireless radio communications system in which at least one station can communicate with at least one other station, or simultaneously with two or more other stations, and each station can handle voice and data traffic simultaneously.

2. History of the Related Art

Military and civilian (e.g., police) forces that engage routinely in mobile operations make heavy use of radio communications between personnel and vehicles. Radio transceivers typically used for this purpose are known as "simplex" or "press-to-talk" radios. For example, in a typical mobile radio communications operating environment, a party in one vehicle may need to communicate simultaneously (and independently) with two or more parties who are on foot or in other vehicles. Mobile system operators accomplish this feat by installing a separate radio in the first vehicle for each of the other parties with whom simultaneous, but independent communications will be maintained. However, operating multiple radios in a vehicle typically causes the problem known as "co-site interference," which can occur when a radio in the vehicle is transmitting one message and another radio in the vehicle is receiving a second message. Consequently, the transmitted signal overpowers or interferes with the signal being received. Currently, this problem of co-site interference is resolved by designing technically complex and expensive equipment that can compensate for the substantial interference caused by the co-located radios.

A number of conventional communications systems use Time Division Multiple Access (TDMA) for transmitting and receiving. TDMA was first developed for use in communications satellite systems, which had to support voice and data communication links between a single space-borne satellite and a large number of geographically separated earth terminals or ground stations. Prior satellite communications systems had used a relatively complicated transmission technique known as Frequency Division Multiple Access (FDMA). A problem encountered with FDMA was that the output power of the earth terminals' transmitters had to be dynamically controlled relative to each other. Specifically, the transmit power of each of the earth terminals had to be independently controlled to ensure that the energy passing through the satellite channel was fairly divided. However, the TDMA transmission techniques that have been developed (and are still being used) solved this energy division problem, by ensuring that the signal from only one earth terminal would pass through the satellite channel at any point in time.

Cellular radio telephone systems are typically operated using TDMA. For example, the so-called "Pan European Cellular System" uses TDMA to allow up to eight portable or mobile telephones to communicate simultaneously with the same base station. These telephones are duplex transceivers that transmit and receive in different frequency bands, and use time division in both bands. Each portable telephone is allocated a specific time slot in the receive band, and also a time slot in the transmit band which is offset by a fixed amount of time from the receive band. Consequently, by allocating the time slots appropriately, the mobile telephones operating in the system can transmit and receive at different points in time and thereby minimize the problem of co-site interference.

An example of the conventional use of TDMA is in the British Army's "Ptarmigan" communications system. The Ptarmigan system includes a base station and a plurality of mobile stations known as Single Channel Radio Access (SCRA) stations. The Ptarmigan system time-multiplexes the base station's transmissions. The base station broadcasts information to several of the SCRA stations, but each SCRA station is designed to select the specific information in the received signal that is intended for it. However, the SCRA stations transmit using frequency division, which avoids a requirement for the base station to time-synchronize the signals received from the SCRA stations.

As a related technical matter, the operations of transferring data (e.g., data records and files, databases, etc.) and transmitting voice information have long been considered two, separate operations. However, with the advent of such new technologies as "telematics" and "multimedia" communications, the telecommunications, computing, data and voice functions have now been integrated. For example, data and voice traffic are currently being transferred between a broad range of "terminal" types, such as telephones, radios, computers, network work stations, etc.

In the field of wireline communications, there has been a recognized need for an efficient method of simultaneously transmitting data and voice traffic. In fact, numerous attempts have been made to create a prominent standard for a combined data/voice communications protocol. One such attempt culminated in the development of the Digital Simultaneous Voice Data (DSVD) System and also a standard protocol. Nevertheless, many other proprietary, combined data/voice systems have also been developed and commercialized in the wireline communications field.

Similarly, in the field of wireless communications, there is a recognized need for a combined data/voice communications protocol. For example, while voice and computer processing operations have been successfully merged in single terminals, the terminal equipment being used has become mobile. Mobile telephones and radios, and portable computers (laptops, notebooks, etc.) have made the telecommunications and information processing technologies highly portable and thereby accentuated the need for a wireless, combined data/voice communications protocol.

A related problem is that voice and data transmission functions have different, and often contradictory, technical and functional requirements. For example, data transmissions are typically required to be error-free. Nevertheless, since the integrity of the data is much more important than the timeliness of its reception, data transmissions can tolerate substantial and variable time delays. Consequently, the existing data protocols employ re-transmission schemes, whereby the data is transmitted and re-transmitted again and again, until it is received error-free at the destination.

Conversely, voice transmissions cannot tolerate long delays, but they can tolerate a moderate amount of errors (at least until the errors become perceptible to a listener). Consequently, because of the different tolerances that data and voice transmissions have to transmission errors, different schemes will have to be used to detect and correct these errors.

Currently, studies are being conducted to determine whether (and how) data and voice traffic can be combined and transmitted simultaneously over wide-area mobile networks, such as the European Global System for Mobile Telecommunications ("GSM") and North American Digital Advanced Mobile Phone System ("D-AMPS") cellular networks. These and other existing cellular networks can support either a data link or a voice link but not both of those links at the same time.

Studies have also been conducted to determine whether local area mobile networks can carry both data and voice traffic simultaneously over relatively short ranges, but the results of these studies have not been promising. For example, wireless local area networks (WLANs) have been optimized to carry high data rate transmissions between a large number of users. Consequently, these networks do not function as well to carry voice transmissions.

Three commercially attractive frequency bands for short-range wireless communications are known as the Industrial Scientific Medical (ISM) bands. In the United States, the ISM bands are defined (by the Federal Communications Commission or FCC) at 900 MHz, 2.4 GHz and 5.7 GHz, and a license is not required to operate within these bands. Throughout the world, a license is not required to operate in the 2.4 GHz ISM band. Therefore, it will be possible to manufacture a broad range of short-range, wireless radio communications products that can be operated in these frequency bands without a license.

However, there are certain rules that ISM band users must follow. In the United States, these rules are set forth in Part 15 of the FCC's Rules, and in Europe, by the European Telecommunications Standards Institute (ETSI) in document number ETS 300 328. Unfortunately, since no operator license is required, many types of equipment are in operation that radiate signals in the ISM bands. So, signal interference from such equipment as remote telephones, baby monitors, microwave ovens, etc. can be encountered in these bands. In fact, the specific amount of interference that may be encountered is unknown, but it can be extremely hostile to radio communications. Therefore, in order to design a radio communications system that can carry data and voice traffic in the ISM bands will require careful consideration of the link protocol.

SUMMARY OF THE INVENTION

A radio communications system is provided that can be operated in an unlicensed band and is capable of carrying data, voice, or data and voice traffic simultaneously. The band is divided into a plurality of channels or hops, and a frame composed of either voice information, data information, or a combination of data and voice information is transmitted during one of the hops. The system operates preferably in a simplex mode, but full duplex operation can also be employed.

The present radio communications system can also be operated in a cellular, TDMA system such as, for example, the GSM and D-AMPS systems. A multiple time slot operation is employed whereby one time slot can carry data and another time slot can carry voice information.

A preferred embodiment divides a repetitive frame into a plurality of time slots that can be used independently for transmission or reception, and for communicating voice or data information. The frequency selected for transmission or reception can be varied from time slot to time slot selectively or randomly according to a frequency hopping algorithm. The present radio system can thus provide increased immunity to interference or deliberate jamming.

In one aspect of the invention, the system utilizes four time slots to provide a simultaneous duplex voice link and packet data link. Digitally-encoded voice traffic is transmitted in one time slot, and a data packet including addressee/addressor and acknowledgment information is transmitted in a second time slot. Digitally-encoded voice traffic is received in a third time slot, and a data packet including acknowledgment of reception of a previously transmitted data packet is received in a fourth time slot. For example, duplex voice traffic can be used for a telephone conversation between two persons, who are simultaneously exchanging data such as text or images to be displayed on a computer monitor in a so-called "white board" communication. The frequency selected for transmission or reception, and for each time slot, can be the same or a different frequency. Consequently, a single radio apparatus can be used to maintain communications simultaneously in several, independent simplex radio nets.

In another aspect of the invention, the radio system employs independent frequency hopping for each time slot selected. Consequently, the system can change the transmit or receive frequency between corresponding time slots in successive frames. Alternatively, the system can change frequency during a time slot. The system can thereby avoid jamming or interception in a military environment, or for civil communications, the system can average the transmission quality over a number of frequencies to avoid prolonged communications in a "poor" channel.

In yet another aspect of the invention, the radio system pseudo randomly permutes the allocation of time slots to different radio nets, in order to avoid interference, interception or jamming of transmissions. The time slots can be allocated pseudorandomly (or nonrandomly) to the different nets on an exclusive or "orthogonal" basis. Consequently, the radio system will not allocate the same time slot in any frame to more than one of the nets.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–12 of the drawings, like numerals being used for like and corresponding parts of the various drawings.

Figure 1:
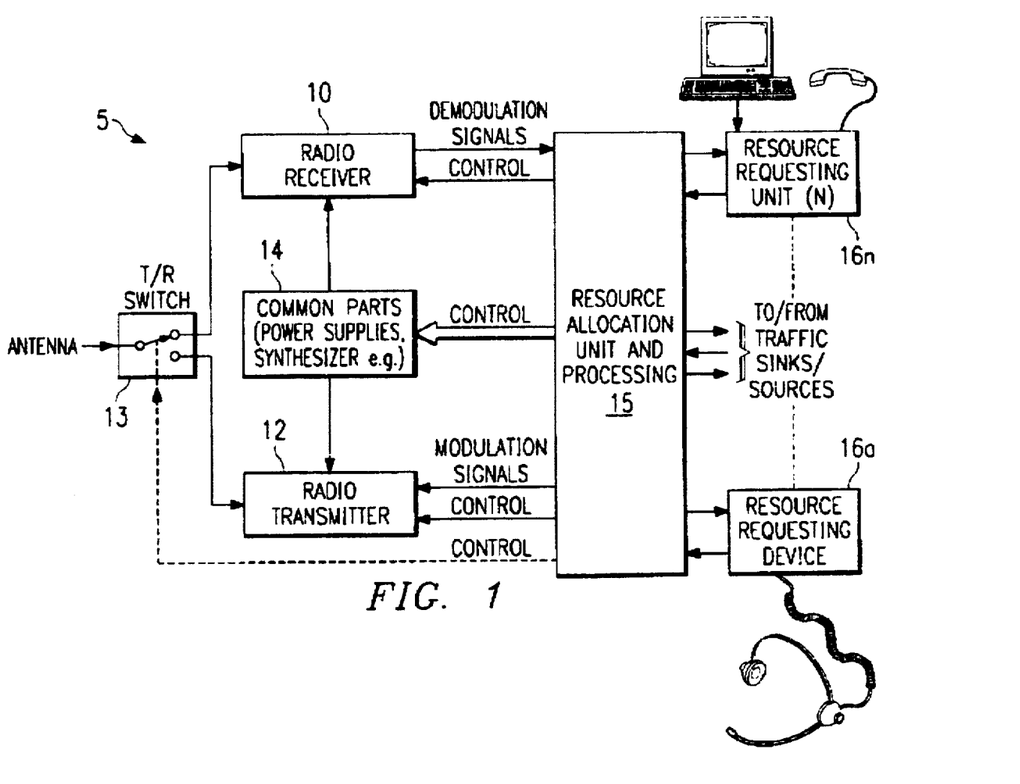
FIG. 1 is a top level electronic circuit block diagram of a radio communications system, in accordance with a preferred embodiment of the present invention.

FIG. 1 is a top level block diagram of a radio communications system that illustrates a preferred embodiment of the present invention. Referring to FIG. 1, radio system 5 preferably includes a radio receiver section 10, a radio transmitter section 12, and a transmit-receive switch section 13 that functions to connect a transmit-receive antenna (not explicitly shown) to receiver section 10 or transmitter section 12. In this embodiment, a common component unit 14 includes components that are common to both receiver section 10 and transmitter section 12, such as, for example, a frequency synthesizer, power supplies, etc.

A resource allocation and processing unit 15 is connected to each of receiver section 10, transmitter section 12, transmit-receive switch section 13, and common component unit 14. Generally, by outputting certain control signals, the resource allocation and processing unit 15 controls the timing of the transmitter and receiver sections and also what frequency (or frequencies) are used to transmit or receive. The communications resources of radio system 5 are allocated by resource allocation and processing unit 15 in units of time (e.g., individual time slots) to one or more of a plurality of resource requesting units $16_{a-n}$. Each of resource requesting units $16_{a-n}$ buffers or temporarily stores data or voice traffic which a user intends to transmit, and releases the stored data or voice traffic in a short burst when resource allocation and processing unit 15 provides a an appropriate command to utilize transmitter section 12.

Similarly, each of resource requesting units $16_{a-n}$ can accept a burst of traffic received by the receiver section 10, buffer the accepted traffic, smooth the flow of received traffic from a plurality of such bursts, detect and correct errors in the received traffic, and perform any appropriate signal handling function that may be needed to match the operating characteristics of the receive channel to the type of traffic being received.

As illustrated by FIG. 1, each of resource requesting units $16_{a-n}$ can be connected to a handset, which allows a plurality of users to communicate independently with one another. Also, as illustrated by FIG. 1, if a user has to communicate with users in other networks, radio system 5 can combine the audio signals accepted from two or more reception time slots and couple the combined signals to the single user's handset. In addition, radio system 5 allows any user (a-n) to select what network (or networks) to which that user can transmit information and communicate. These selections are controlled by the resource allocation and processing unit 15.

For example, radio system 5 can allocate two time slots to a network. Station "a" may transmit in the first time slot and receive in the second, while station "b" may transmit in the second time slot and receive in the first. In this manner, both stations can communicate with each other simultaneously and thereby establish a duplex- or telephone-type link.

In a different aspect of the embodiment illustrated by FIG. 1, added security against jamming (e.g., in a military environment) can be provided. A conventional countermeasure used against jamming is to frequently alter the radio's transmission frequency. The effectiveness of this countermeasure depends upon the length of time the radio transmits at a given frequency. For example, a radio transmission that lasts for 40 ms at one frequency is about eight times more likely to be detected and jammed by a scanning receiver, than a transmission that lasts for only 5 ms. In one implementation of the invention, radio system 5 can divide 40 ms transmission "frames" into eight 5 ms time slots, but uses the same frequency for each of the 5 ms slots. Consequently, transmissions that occur in the later time slots will have a higher probability of being detected and jammed than transmissions occurring in the earlier slots. The effects of such jamming can be more evenly spread by not always allocating the same time slot to the same network or service, for example, but by randomly permuting the time slots so that a given network or service is sometimes first and sometimes last to transmit (changing the transmission frequency). This aspect of the present invention will be described in more detail below.

Preferably however, this unequal vulnerability of different time slots to jamming can be overcome by changing the transmission frequencies of time slots within a frame. For example, in yet another aspect of the embodiment illustrated by FIG. 1, radio system 5 can be used to change the transmission frequency during the interval between consecutive time slots (independent frequency hopping). A random sequence generator is used to generate a transmission frequency sequence for the time slots. The sequence can be encrypted with a secret number or key, so that the key is needed to predict the next frequency in the sequence. For example, such a random sequence generator can be implemented in software or firmware, under the control of a microprocessor or digital signal processor.

Figure 2:
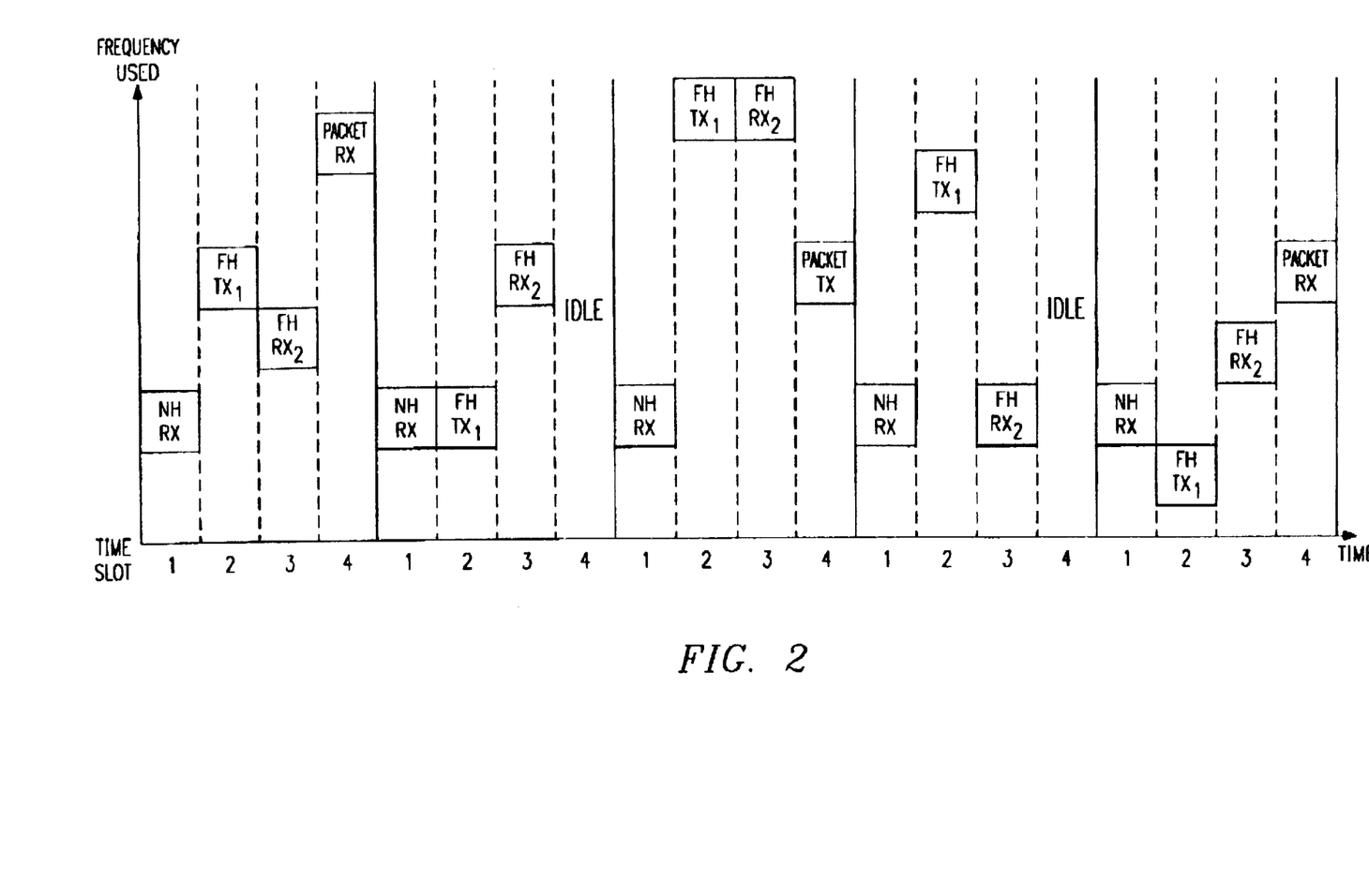
FIG. 2 is a diagram that illustrates frequency hopping, in accordance with the embodiment illustrated by FIG. 1.

FIG. 2 is a diagram that illustrates how independent frequency hopping can be accomplished, in accordance with the embodiment shown in FIG. 1. A frequency sequence generator (not explicitly shown) included in resource allocation and processing unit 15 generates a random sequence of time slot frequencies. The sequence determines the transmission frequencies for a succession of time slots in a frame. Alternatively, the frequency sequence generator can be selectively controlled by the resource allocation and processing unit 15 to maintain the same frequency (no hop) between corresponding time slots in consecutive frames.

For example, referring to FIG. 2, a diagram is shown that illustrates an exemplary transmission/reception scheme using four time slots per frame. For example, in using the radio system illustrated by the embodiment shown in FIG. 1, each time slot can be allocated to one network or service, frequency allocation for the time slots being either randomly hopped or selectively controlled, and the time slots can be used independently for transmit or receive. When switching frequencies between adjacent time slots, the radio system allows a sufficient "guardtime" between slots to allow, a complete frequency transition, which allows for timing uncertainties such as propagation delays and inherent frequency agility limitations of the hardware.

FIG. 2 illustrates using the radio apparatus of FIG. 1 to operate in a mixture of non-frequency-hopped and randomly frequency-hopped transmit and receive modes, as well as in voice and packet data modes. In the example shown in FIG. 2, each frame is composed of four time slots. Each time slot can be 5 ms in duration. In time slot 1 of the leftmost frame, the radio system is receiving traffic in a non-hopping mode. Moving later in time, the second time slot is transmitting (in net 1) traffic in a random frequency hopping mode, the third time slot is receiving (in net 2) traffic in a random frequency hopping mode, and the fourth time slot is receiving packet or burst data. In this example, time slots 1–3 are used for one of either transmit or receive, while time slot 4, used for packet (burst) data is alternated between transmit and receive in different frames as needed by the packet protocol used.

The embodiment illustrated by FIG. 1 can also provide added security against jamming. For example, the protections against signal interception and jamming are not as effective if a given network is known to be active for specific, regular periods of time. Consequently, a pulse jammer can be used to concentrate its energy at those instants, which can effectively disrupt communications in that network. A countermeasure used against this type of jamming ensures that the same time slot is not always allocated to the same network, but rather that different networks share the time slots in a random manner. However, since the same time slot may not be used by a radio apparatus for more than one purpose (transmission or reception) at a time, it is important to be able to coordinate the use of the time slots between the different nets.

A technique known as "orthogonal sharing" can be used by two or more frequency hopping radios to share a plurality of frequencies. This technique is described in British Patent No. 8118954 (Dent, filed Jun. 19, 1981). A variant of the orthogonal sharing technique can be used with random hopping as an effective countermeasure against pulsed and similar types of jamming. This technique is described below with respect to FIG. 3.

Figure 3:
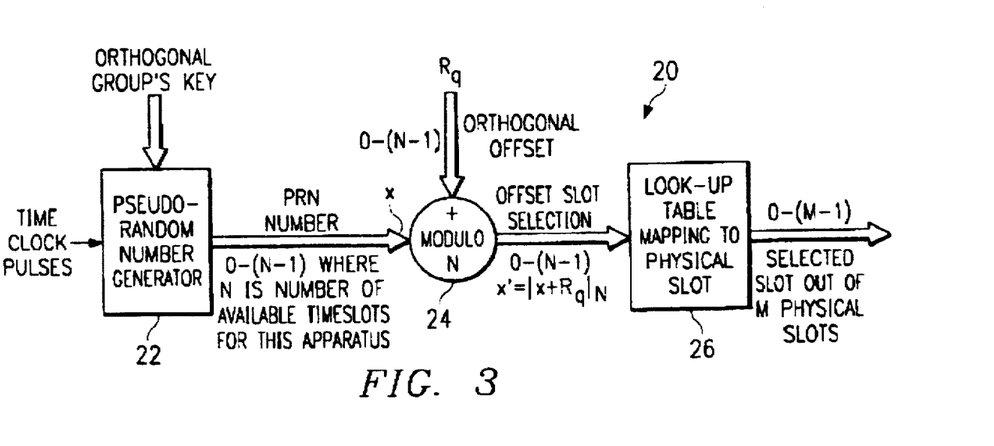
FIG. 3 is a block diagram of a structure and method for generating and allocating random, orthogonal time slots, in accordance with the embodiment illustrated by FIG. 1.

FIG. 3 is a block diagram that shows a structure and method that can be used to generate and allocate random, orthogonal time slots, in accordance with the embodiment illustrated by FIG. 1. Generally, the system illustrated by FIGS. 1 and 3 provides time-sharing between a plurality of nets using a pseudorandom, orthogonal method of allocation. This method allows the radio system to simultaneously allocate specific frequencies and time slots for transmission and reception.

Referring to FIG. 3, a time slot allocating unit 20 is shown, which includes a pseudorandom number (PRN) generator 22. Generator 22 can be programmed to generate a plurality of numbers between 0 and N−1, where N is the number of time slots available to be selected for a particular net. The output of generator 22 is represented by a random number "x", where x=0–(N−1). However, N can also represent a subset of the total number of time slots available, since it may be desirable not to select particular time slots for particular nets. The mapping of a random number to a physical time slot is accomplished by a look-up table 26. If the total number of time slots available is relatively small, look-up table 26 can be a simple look-up table that correlates specific numbers with specific time slots. However, if the total number of available time slots is relatively large (e.g., several hundred), then a method may be used to reduce the table's size (described below with respect to FIG. 4).

A modulo-N adder 24 adds an orthogonal offset, $R_q$, to the output signal from the pseudorandom number generator 22. Consequently, the product of the modulo-N addition to the pseudorandom number is an offset pseudorandom number, x', where $x'=lx+R_qlN$. The use of a modulo-N addition to the pseudorandom number ensures that the resulting number is still within the desired range of 0–(N−1), which is within the subset of time slots permitted to be selected. Notably, different nets can use the same pseudorandom number generator (22), so that the value of the pseudorandom number, x, is identical for each of the nets. However, by using different values for the orthogonal offset, $R_q$, different numbers can be created for the offset pseudorandom number, x', so that different time slots can be allocated for use by the different nets.

A potential countermeasures problem encountered with a pseudorandom, orthogonal number time slot allocation approach is that a time slot used by one net is related by a constant value to the time slots used by the other nets. For example, if the number of time slots permitted, N, is 7, and the pseudorandom generator produces the sequence:

5,1,0,3,6,2,5,4,4,2,0 . . . , then a net that adds an orthogonal value of 3 will use the time slot sequence:

1,4,3,6,2,5,1,0,0,5,3 . . . But another net that adds an orthogonal value of 4 will use the time slot sequence:

2,5,4,0,3,6,2,1,1,6,4 . . . Consequently, the time slot sequence for the second net (orthogonal offset of 4) can be predicted relatively easily from the time slot sequence of the first net (orthogonal offset of 3). So, the pseudorandom sequence for all of the nets may be determined by detecting the sequence of any net. Nevertheless, that problem can be resolved.

Figure 4:
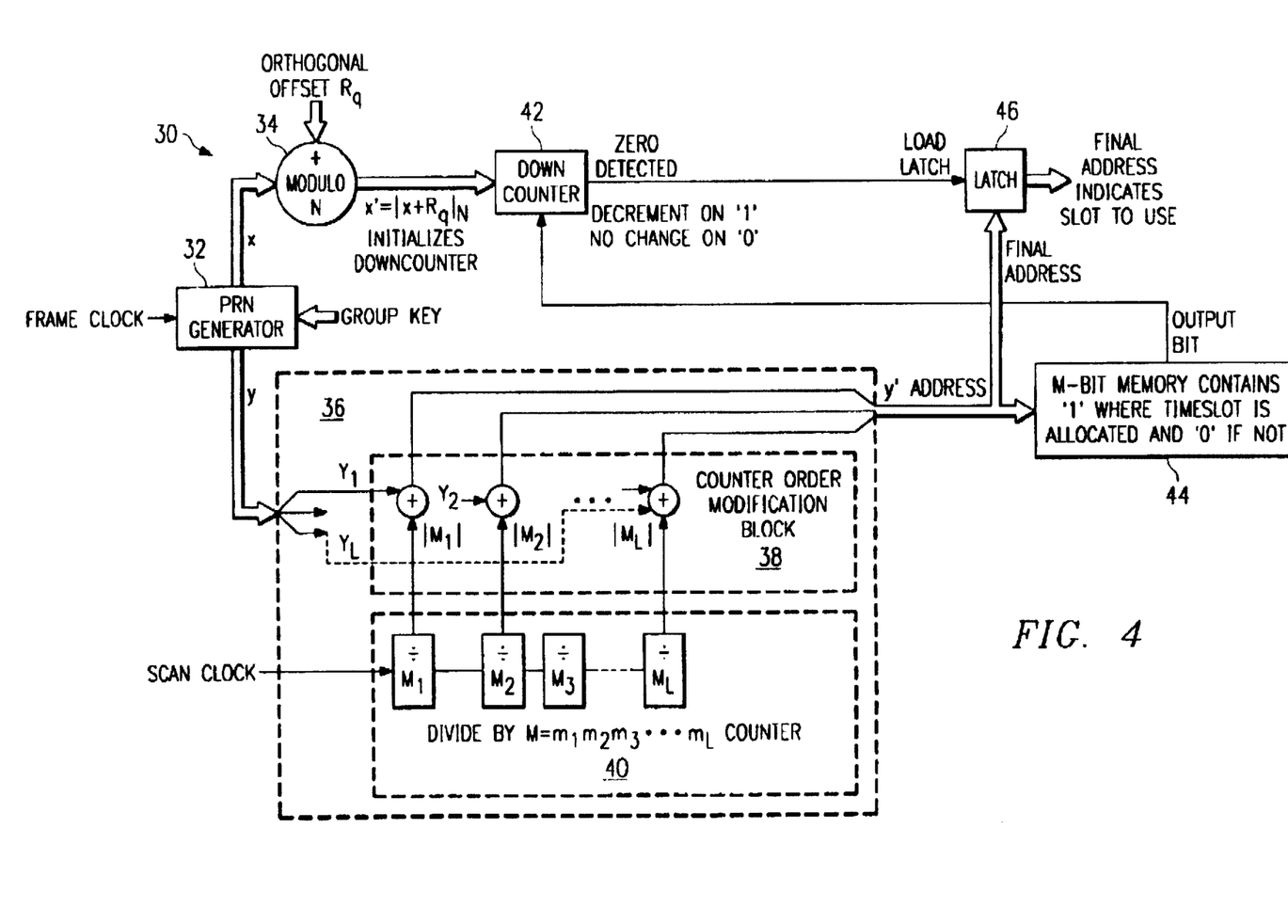
FIG. 4 is a block diagram of a second structure and method for generating and allocating random, orthogonal time slots, in accordance with the embodiment illustrated by FIG. 1.

FIG. 4 is a block diagram of a structure and method that can be used to generate and allocate random, orthogonal time slots and also protect against detection and jamming, in accordance with another aspect of the embodiment illustrated by FIG. 1. Referring to FIG. 4, a pseudorandom, orthogonal time slot allocation unit 30 is shown, which includes a PRN generator 32. Generator 32 is preferably programmed to generate numbers between 0–(N−1), where N is a subset of the number M, and M is the total number of time slots available to be selected for a particular net. An output of generator 32 is coupled to an input of a modulo-N adder 34, where an orthogonal offset, $R_q$, is added to the pseudorandom number, x. The output of the modulo-N adder 34 ($x'=lx+R_qlN$) is coupled to an input of a down counter 42. An output of an M-bit memory unit 44 is coupled to a second input of the down counter 42.

M-bit memory unit 44 outputs a "1" if an allocated time slot is within the permitted subset, and "0" if it is not. Consequently, the M-bit memory unit 44 contains N "ones" and M−N "zeros". The value of the pseudorandom, orthogonal number, x', includes information that can be used to determine which of the N time slots indicated by a "1" bit can be selected for use. So, the M-bit memory 44 can be ordered in a predetermined manner, such as, for example, by numbering the memory locations from right to left, left to right, or some other predetermined order. Consequently, in order to determine which "1" is, for example, the "x'th 1", the M-bit memory's addressing order may be so defined.

The addressing order of the M-bit memory 44 is defined by determining the configuration of the scan counter 40, which in this embodiment, is modified by the operation of the modulo-adders (38). If modulo-adders 38 are omitted, the apparatus is still operative, albeit with the aforementioned security shortcomings. The down counter 42 is configured to decrement for every "one" bit scanned. By presetting down counter 42 to a desired number, x', the down counter will decrement to zero and output an appropriate control signal to an input of latch 46 when the x'th "1" is scanned. At that instant, an address provided at an output of an addressing unit 36 (to be described in detail below) is latched into latch 46. The latched address indicates to radio system 5 (FIG. 1) which physical time slot has been allocated for transmitting or receiving.

In order to prevent the detection of a time slot allocated to one net by the observance of a time slot allocated to another net, the pseudorandom orthogonal number can be mapped to a physical time slot by varying the order in which down counter 42 scans the M-bit memory unit 44. For this purpose, addressing unit 36 can include a counter order modification sub-unit 38, and a divide-by-M counter sub-unit 40. Preferably, the divide-by-M counter sub-unit 40 is subdivided into a plurality of subcounters $m_1, m_2, m_3 \ldots m_L$. An output of each sub-counter, the sub-digit $m_i$, is coupled to an input of a corresponding sub-digit modulo adder $\{m_1\}$, $\{m_2\} \ldots \{m_L\}$ in counter order modification sub-unit 38. Consequently, each sub-counter digit, $m_i$, can be modified by a modulo value, $m_q$, thereby adding an offset to the address coupled to the inputs of the M-bit memory unit 44 and latch 46. The plurality of offsets of the digits $m_1, m_2, \ldots m_L$ are shown, collectively, as an offset address, y'. The pseudorandom number generator 32 and the divide-by-M counter sub-unit 40 can be clocked to generate a new offset address for every frame, which essentially makes the offset address an auxiliary output of the pseudorandom number generator. Consequently, the numerical order of the physical time slots being allocated can be randomly varied from frame to frame in an unpredictable manner (unless the pseudorandom number generator key is known). Therefore, in accordance with the present invention, an orthogonal offset to a physical time slot that is allocated to one net will not be a constant and detectable offset with respect to a physical time slot allocated to another net.

As a related encryption problem, to ensure that the number, M, may be factorizable even if the number of physical time slots is a prime number, the size of the M-bit memory 44 can be made larger than the physical number of time slots available, and the additional bit locations can be set to "zero". Consequently, the number, M, can be expanded (if necessary) to a number that is a power of 2, and the count order modification sub-unit 38 can be configured to perform a bit-wise modulo-2 addition to the address control bits, y, and the value y provided by PRN generator 32 may then be simply a block of pseudo-random binary bits that may take on any value, and does not have to be constrained to lie in a number range that is not a power of 2.

Also in accordance with the embodiment illustrated by FIG. 1, any operational combination of orthogonal or non-orthogonal frequency hopping and/or time hopping schemes can be implemented. For example, a radio system can be implemented that uses orthogonal frequency hopping. Generally, a group of nets that orthogonally allocate their time slots are not constrained in their selection of transmission/reception frequencies relative to each other. However, another group of nets may be using the same time slots as the first group, and those groups may not be selecting their time slots in a manner orthogonal to the selections made by the first group. In that case, it would be advantageous for the second group of nets to select operating frequencies that are orthogonal to the frequencies selected by the first group, which ensures that a collision does not take place in time and frequency together. In general, the use of orthogonal frequency selection is advantageous when, for example, a net has a relatively high transmit duty factor and a unique transmit frequency is required to avoid interference. Conversely, a net may operate with a relatively low transmit duty factor using non-orthogonal frequency selection. A greater number of low-duty-factor nets may then be allowed to operate than there are frequencies multiplied by time slots available, because the low duty factors will provide an acceptably low probability of collision in both time and frequency.

Therefore, to obtain maximum operational flexibility, a radio system structured in accordance with the embodiment illustrated by FIG. 1, can be configured to select orthogonal or non-orthogonal transmit or receive frequencies independently of the system's allocation of orthogonal or non-orthogonal time slots. Preferably, the nets to be operated with orthogonally offset time slots are those nets intended for simultaneous reception at the same site. The same nets could be operated with frequencies that are orthogonally offset from each other when their receptions are intended for different sites.

However, combining the operations of orthogonal time hopping with frequency hopping may require that different pseudorandom number generator keys or sub-keys be used for the time hopping and frequency hopping operations. If so, then a preferred approach is to time share the same random number generator and provide a capability to reinitialize it between the time slot and frequency selection operations.

Figure 5:
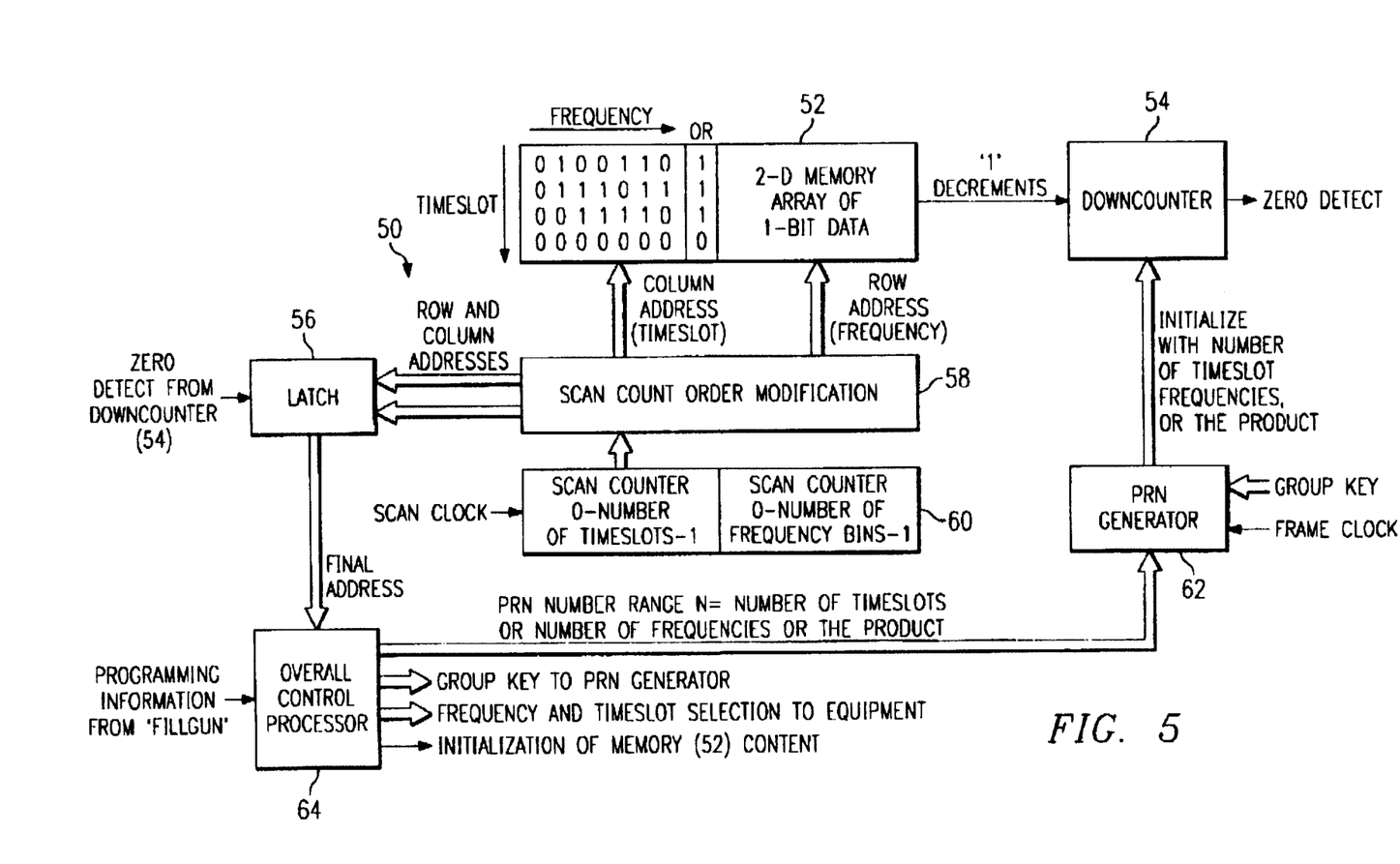
FIG. 5 is a block diagram of a structure and method for selecting and allocating frequencies and time slot in accordance with the embodiment illustrated by FIG. 1.

FIG. 5 is a block diagram of a frequency and time slot allocation unit 50, which is structured in accordance with the embodiment illustrated by FIG. 1. The frequency and time slot allocation unit 50 can simultaneously allocate frequencies and time slots where the frequency/time allocations are interrelated and involve relatively complex operations. For example, certain frequencies in a radio band may be unavailable for use, because they are dedicated as fixed frequencies in one or more nets using TDMA (e.g., certain military nets). So, these dedicated frequencies can be blocked out by storing zeroes in corresponding positions of the two-dimensional memory array 52.

As illustrated by FIG. 5, the bit pattern stored in memory array 52 (at any instant) determines which time slot and frequency combinations are available to be allocated or selected for use by the apparatus. An advantage of using two-dimensional memory array 52 is that the memory can be scanned to determine what frequencies are available for use at any point in time (i.e., in all time slots) or conversely, what time slots may be used on a given frequency. For example, if a user desires to determine if a specific time slot is available for use with any of the frequencies allotted to a short-range band, a logical "OR" structure can be included (exemplified by the additional column shown at the right side of the array) to address all of the rows. Upon selecting a time slot of interest (with the bit pattern in the "OR" column), only the frequency of the corresponding row (e.g., the frequency of the second row from the right) in the array will be scanned and selected.

Similar to the structure described earlier with respect to FIG. 4, an output signal containing the "OR"ed scanned bit information is coupled to an input of a down counter 54. Down counter 54 functions to decrement from an initial number which can represent, for example, the number of time slots, number of frequencies, or product of the number of time slots multiplied by the number of frequencies. The down counter decrements when a "1" is detected from the memory array output. When the down counter decrements to "zero", a control signal is output to a latch 56. At that instant, latch 56 latches input row and column addresses that are coupled from one or more outputs of a scan count order modification unit 58. The latched row and column address information represents the "final" addresses of the time slot and frequency bin that have been selected for use. A scan counter unit 60 outputs to scan count order modification unit 58 a scan count that represents the time slots and frequency bins possible to be selected (under the control of processing unit 64). Scan count order modification unit 58 outputs a column address and row address, respectively, for each time slot and frequency to be stored in memory array 52.

If an orthogonal frequency is desired for use with the time slot selected, a PRN generator 62 is informed (by a user) about the address of the time slot selected, so that a frequency can be generated by radio system 5 (FIG. 1) which falls with the range of frequencies available for use with that time slot. Specifically, referring to FIG. 5, the final address of the time slot and/or frequency bin selected, is output from latch 56 and coupled to an input of a processing unit 64. Processing unit 64 can be, for example, a digital signal processor or microprocessor, which provides a number range, N (e.g., available number of time slots, frequencies, or their product), to PRN generator 62. Generator 62 generates a pseudorandom number "x" in the range 0–(N−1), where N is input from processing unit 64. In response to a user's request, processing unit 64 also outputs bit information to memory array 52 to initialize the contents of the memory locations in the array. An output of PRN generator 62 couples the pseudorandom number "x", to an input of down counter 54, which is the initialization number for the down counter. A third output of processing unit 64 couples the frequency and time slot selection information to radio system 5, for use in selectively transmitting and receiving traffic using time hopping and frequency hopping.

Alternatively, a logical "OR" can be added as an extra row of memory locations (not explicitly shown) in order to determine whether a particular frequency is available for any time slot desired to be selected. As such, if the frequency generator in radio system 5 attempts to select a frequency that is not available for the time slots being used, then the order of the selections can be controlled. The system can select each time slot after the frequency selection has been made and also after a determination has been made that the frequency is available for use with that time slot. As another alternative, the time slot selection can be made first, followed by a selection of any frequency available for that time slot.

As yet another alternative, the entire memory array 52 may be scanned, row by column, in a random order. Whenever a "1" is scanned, down counter 54 is decremented. When the down counter reaches "zero", due to the randomness of the scan, the time slot/frequency combination selected will be a jointly orthogonal selection with respect to any other net using a different time slot/frequency orthogonal offset. However, this orthogonality with respect to other nets' orthogonal offsets is not assured if the orthogonality applies only to time or frequency. To assure mutual orthogonality between a number of nets, they must all agree on one of the above optional methods.

Figure 6:
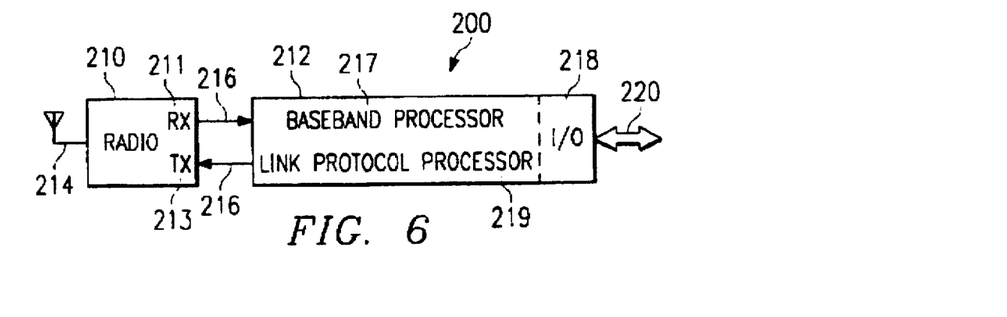
FIG. 6 is top level electronic block diagram of a radio communication system, in accordance with a second embodiment of the present invention.

A second embodiment of the present invention is provided that can support simultaneous data and voice transmissions in a short-range radio system. FIG. 6 is a top level block diagram of a radio communications system that is structured in accordance with a second embodiment of the present invention. Referring to FIG. 6, a radio system 200 is shown that includes a radio transmitter/receiver unit 210 and a signal processing unit 212. A transmit/receive antenna 214 is connected to the transmitter/receiver unit 210. The transmitter/receiver unit 210 is coupled to signal processing unit 212 through leads 216, which are preferably coaxial cables. Processing unit 212 includes a baseband section 217, link protocol section 219, and input/output (I/O) section 218. The I/O section 218 can be coupled to a handset or headset of an operator through voice and data leads 220.

Generally, for transmitting, digital data or voice traffic is coupled from an operator through leads 220 and I/O section 218 to link protocol processor section 219. Link protocol section 219 converts the digital data or voice traffic into a bit stream that is in accordance with a predetermined link protocol. The transmit section of radio transmitter/receiver unit 210 converts the bit stream received from link protocol section 219 into an appropriate RF carrier to be transmitted via antenna 214. For this embodiment, the frequency of the signal to be transmitted is preferably in an unlicensed band. However, the invention is not intended to be limited to any particular band of frequencies, and any appropriate frequency may be used.

For receiving, an incoming RF signal that carries data or voice traffic is received via antenna 214 and coupled to the receiver section of transmitter/receiver unit 210. The receive section of transmitter/receiver unit 210 converts the incoming RF signal to an appropriate bit stream of data and/or voice information. The bit stream is coupled to the baseband processor section 217 of the signal processing unit 212. The baseband processor section 217 further converts the data and/or voice information into an appropriate signal which is coupled via the I/O section and leads 220 to the operator.

Figure 7:
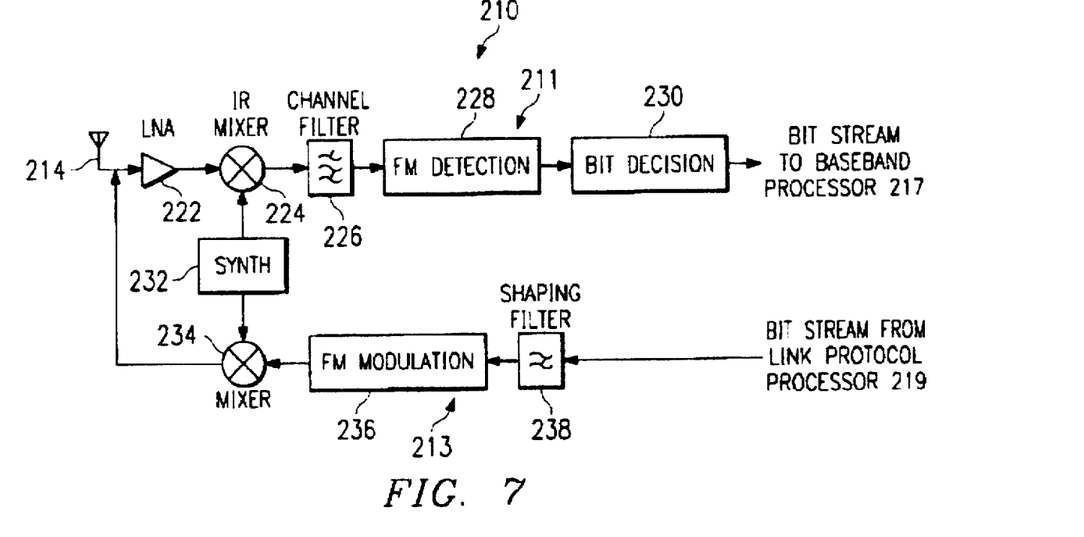
FIG. 7 is an electrical schematic circuit block diagram of the radio transmitter/receiver section shown in FIG. 6.

FIG. 7 is an electrical schematic circuit diagram of the radio transmitter/receiver unit 210 shown in FIG. 6. Referring to FIG. 7, certain details of receiver section 211 and transmitter section 213 are shown. Receiver section 211 includes a signal preamplifier (preferably a low noise amplifier or LNA) 222, which amplifies the RF signal received via antenna 214. The output of amplifier 222 is coupled to a mixer 224, which down-converts the received RF signal to an IF signal for further processing. Alternatively, mixer 224 can convert the incoming RF signal directly to a baseband frequency (if using, for example, a homodyne receiver), such as described in U.S. Pat. No. 5,241,702. Preferably, mixer 224 is an image rejection (IR) mixer, the conversion frequency of which is driven by a local oscillator signal from synthesizer 232 (which may be as described in U.S. Pat. No. 5,180,993). The down-converted signal from mixer 224 is coupled through a channel filter 226, which functions to reject noise and other interference in adjacent hops in the down-converted signal. The filtered signal from channel filter 226 is coupled to an FM detector 228 and a bit detector 230, which extract the incoming voice information or data, respectively, from the down-converted signal. The resulting bit stream representing the voice and/or data information is coupled to the baseband processor section 217.

Transmitter section 213 is preferably configured to operate as a binary FM transmitter. If, for example, a relatively inexpensive implementation of a short-range communications system is desired, transmitter section 213 can be configured to operate using a binary FSK modulation scheme. In that regard, the bit stream of data or voice information to be transmitted is coupled from link protocol processor section 219 to a shaping filter 238. A shaping filter can be used to shape the signal (bit stream) input to FM modulator 236, in order to reduce the size of the sidebands in the transmitted signal spectrum. For this embodiment, shaping filter 238 produces Gaussian shaping of the FSK signal, which results in a GFSK signal to be transmitted. The shaped bit stream from shaping filter 238 is coupled to an FM modulator 236, which is preferably an IQ modulator (such as described in U.S. Pat. No. [application Ser. No. 08/305,702]). Alternatively, modulator 236 can be, for example, a directly modulated VCO.

Modulator 236 modulates the bit stream representing the voice information or data to produce an intermediate frequency GFSK signal. The IF signal from modulator 236 is upconverted to an appropriate carrier frequency (e.g., in an unlicensed frequency band), by mixing the modulated signals at mixer 234 with a local oscillator signal from synthesizer 232. The local oscillator signal determines the frequency of the carrier signal that is to be transmitted from antenna 214. Unwanted components of the mixed signal can be suppressed by using a transmitter filter (not explicitly shown) or a transmitter phase-locked loop (PLL) circuit (not explicitly shown). The up-converted signal from mixer 234 can be coupled to antenna 214 directly, or first through a power amplifier (not explicitly shown) to increase the power of the transmitted signal.

Figure 8:
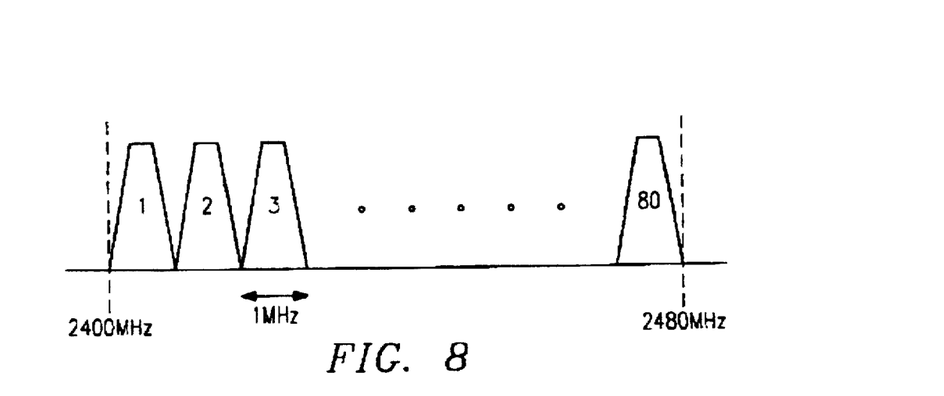
FIG. 8 is a graph that illustrates how a plurality of signals can be transmitted and/or received by the transmitter/receiver section shown in FIG. 7.

FIG. 8 is a graph that illustrates a plurality of signals being transmitted and/or received by transmitter/receiver unit 210 in a frequency band of interest, such as, for example, an unlicensed frequency band. Referring to FIG. 8, the frequency band shown is divided into a plurality of channels, bins or hops, which are not necessarily consecutive. For the frequency band shown in FIG. 8, all of the hops or channels preferably have the same bandwidths. For this embodiment, an unlicensed band of frequencies in the range between 2.4 GHz to 2.48 GHz can be divided equally into 80 hops that are each 1 MHz wide. The bit stream of data or voice information to be transmitted by transmitter section 213 can be packed into a data burst or packet using burst-builder or packetizer software and hardware (not explicitly shown). Preferably, all of the bits of data or voice information that constitute any individual burst or packet are transmitted (or received) in the same hop. Consecutive packets can be transmitted using different hop frequencies that are selected in a pseudo-random manner, such as, for example, by using a frequency-hopping sequence generator according to the above-described principles. In this embodiment, the hop frequencies are provided by synthesizer 232 (FIG. 7), which can generate the different hop frequencies at an appropriate (e.g., high enough) rate.

Transmitter section 213 and receiver section 211 are preferably synchronized, so that both sections will transmit and receive in the same hops. In other words, if the transmitter unit transmits in hop 3 (FIG. 8), then at the same time, the receiver unit also receives in hop 3. In an aspect of this embodiment, using a frequency division duplex (FDD) technique, frames of data and voice information can be transmitted and received simultaneously, even if the transmissions and receptions are at different hop frequencies, by using different transmit and receive bands together with a duplexing filter. However, the preferred embodiment uses a time division duplex (TDD) technique, whereby the transmitter/receiver unit 210 transmits and receives using different time slots, and can then transmit and receive in the same frequency band.

Figure 9:
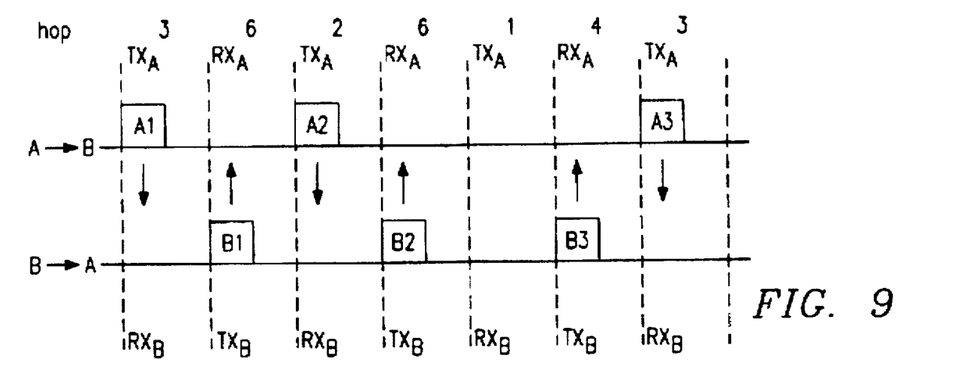
FIG. 9 is a graph that illustrates a method of time division duplex frequency hopping, in accordance with the embodiment illustrated by FIG. 6.

FIG. 9 is a graph that illustrates a TDD frequency hopping technique that may be used, in accordance with this embodiment of the present invention. The radio system may transmit and receive in different time slots using the same hop frequencies, or it may hop to different frequencies between transmit and receive. Referring to FIG. 9, time is divided into TX (transmit) and RX (receive) slots. During each such slot, a digital data burst may be transmitted. An exemplary pseudo-random hopping sequence is shown (e.g., 3, 6, 2, 6, 1, 4, 3, . . . ) for illustrative purposes only, but the invention is not intended to be so limited. Any appropriate pseudo-random hopping sequence may be used. As illustrated by FIG. 9, any two "terminals" that are connected by the TDD scheme described herein are synchronized for both the slot timing and frequency hopping sequence being used. However, the timing of the two terminals' receptions and transmissions are 180 degrees out-of-phase. In other words, one terminal transmits while the other linked terminal preferably receives.

Synthesizer 232 (FIG. 7) preferably uses a medium hop rate, in order to ease implementation of the system and minimize power consumption. A medium hop rate provides a significant degree of immunity against any co-users of the frequencies, and also against any interference/jamming that can occur in the frequency band being used (e.g., unlicensed band). If the link being operated carries speech traffic that has been digitized, a block of digital speech information is preferably transmitted in every time slot. This technique provides a synchronous, circuit-switched connection for voice transmissions. Co-user interference is reduced by the use of pseudo-random hopping.

On the other hand, data traffic is transmitted only when it is available (asynchronous). Consequently, during pauses in the data traffic, no data information is transmitted and the time slots that occur remain empty (referred to as discontinuous transmissions or DTX), or alternatively are used for receiving to determine if other traffic addressed to the apparatus is present. Consequently, the data transmissions display a packet-switched behavior.

Figure 10:
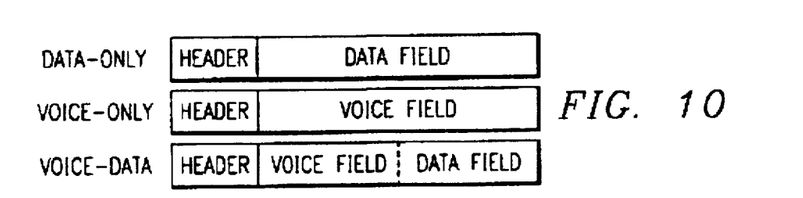
FIG. 10 is a graph that illustrates types of information that can be transmitted or received, in accordance with the embodiment illustrated by FIG. 6.

FIG. 10 illustrates the types of information that can be transmitted or received by transmitter/receiver unit 212, in accordance with this embodiment of the present invention. Referring to FIG. 10, three types of burst information can be transmitted or received: a data burst, a digital voice burst, or a combined data-voice burst. Each such burst includes a header section and payload section. For synchronization purposes, a header can be preceded by a preamble. The header typically contains link control information, while the payload contains the data or voice information.

For this embodiment, the data burst is used for a pure data connection. The data in the burst can be error protected by a retransmission scheme (e.g., an automatic retransmission request or ARQ scheme), or a forward-error-correction (FEC) scheme. Consequently, if a burst is interrupted by a collision with another transmission (e.g., from a co-user or jammer), it can be repeated in another hop (as illustrated below in FIG. 11).

Figure 11:
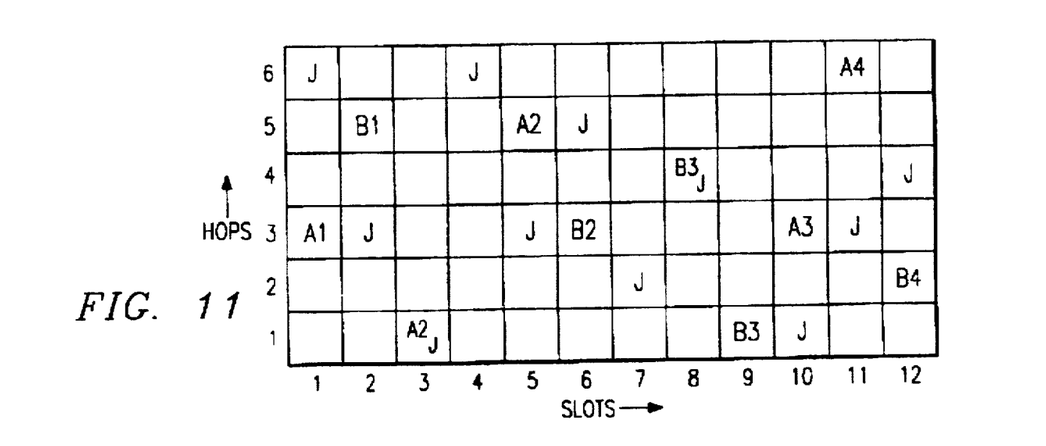
FIG. 11 is a graph that illustrates a data transmission and protection scheme, in accordance with the embodiment illustrated by FIG. 6.

FIG. 11 is a graph that illustrates a data transmission and protection scheme, which can be used in accordance with this embodiment of the present invention. Referring to FIG. 11, an exemplary data transmission link between two users, A and B, is illustrated. Also, a jammer "J" (e.g., an interfering radio signal) on that link is shown. For illustrative purposes, the users and jammer are transmitting bursts in different hops at different times. For example, in slot 3, user A's second burst transmission is interrupted by jammer J's transmission, because they are both occurring in hop 1. Consequently, using the above-described ARQ scheme, burst A2 can be retransmitted in time slot 5 (e.g., in hop 5).

In order to carry out the illustrated ARQ scheme, link information regarding the ARQ scheme (e.g., positive or negative acknowledgment) can be carried in the header of a return burst (referred to as "piggy-backing"). For error correction, extra bits of information (e.g., parity bits) can be added to the payload of a transmitted burst, and the payload can thus be checked for transmission errors by checking the extra bits. This feat can be accomplished by adding a cyclic redundancy check (CRC).

If an erroneous payload should be detected in one burst, it can directly be retransmitted in the next burst, which preferably uses a different hop. An advantage of this "fast, unnumbered ARQ scheme" is that it is simple and efficient since only the corrupted bursts are retransmitted, as opposed to less efficient ARQ schemes such as "GO-BACK-N ARQ"

Figure 12:
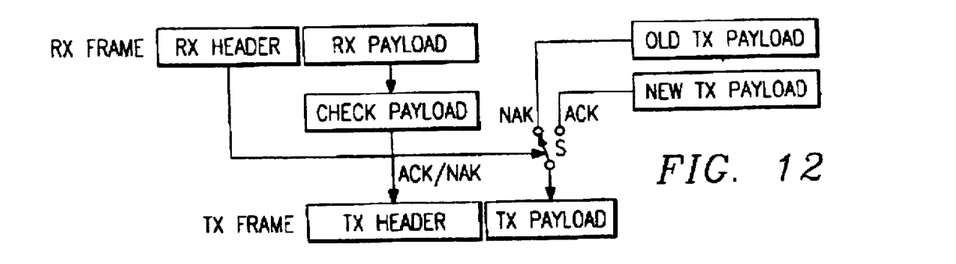
FIG. 12 is a block diagram of a method by which errors can be corrected, in accordance with the embodiment illustrated by FIG. 6.

(non-corrupted bursts are also retransmitted), or more complex numbered SELECTIVE ARQ schemes. This type of fast, unnumbered ARQ scheme requires only a positive acknowledgment (ACK) or negative acknowledgment (NAK), respectively, when a burst has or has not been transmitted. If no ACK or NAK signal is received, a NAK signal is assumed. An exemplary fast, unnumbered ARQ scheme that can be used in the link protocol processor section 219 (FIG. 6) is illustrated in FIG. 12.

The fast, unnumbered ARQ scheme requires hardware implementation at the lowest physical level in order to make quick decisions regarding the retransmission and return ACK/NAK information. FIG. 12 illustrates an exemplary block diagram of such a hardware implementation. Referring to FIG. 12, the header of a received burst or packet preferably contains the ARQ information (ACK or NAK signal) regarding a previously transmitted packet. If the received header contains an ACK signal, then it is assumed that the previously transmitted packet has been successfully received, and a new payload may be transmitted. If a NAK signal is received, then it is assumed that the previous packet was transmitted with an error (or was not received at all), and the original payload should be retransmitted. As illustrated by FIG. 12, the header of the received packet is used to control the position of switch "S". The data payload of the received packet is checked for errors. If no error is detected, then an ACK signal is inserted in the header of the packet to be transmitted. Otherwise, a NAK signal is inserted in that header. If no packet has been received in that receive slot being scrutinized, a NAK signal is inserted in the header of the packet to be transmitted.

For this embodiment (again referring to FIG. 10), the voice bursts contain only speech information. A speech codec (not explicitly shown) that can be used is preferably a waveform codec that provides a relatively low time delay and is highly robust with respect to errors. The speech information can be protected by, for example, an FEC scheme. Preferably, an ARQ protection scheme is not used. In this embodiment, a modest ARQ protection scheme is used in which the voice burst is retransmitted during a limited retransmit "window" in time. If, however, no successful transmission of voice information has occurred during this window, the succeeding voice burst may be transmitted and retransmitted during the next retransmit window.

This technique of processing "time-bounded" information such as speech information typically introduces a variable time delay in the voice transmissions. The variation in these delays can be removed by using the maximum possible delay (indicated by the duration of the retransmit window). However, this technique can increase the total delay time of the voice connection.

In order to ameliorate such a time delay, the use of the preferred method of combining medium-rate frequency hopping and speech coding will provide a communications link wherein the perceptible speech quality will be hardly affected when a relatively small number of hops (equivalent to a few TDMA frame periods) are interrupted by errors. The voice bursts are preferably used in a purely synchronous speech connection, or during pauses in the asynchronous data in a simultaneous data-voice connection.

Referring again to FIG. 10, in accordance with this embodiment of the present invention, a combined voice-data burst or packet preferably contains two fields: a voice field and data field. The voice field can be protected using an FEC protection scheme. The data field can be protected by using both an FEC and ARQ scheme. Preferably, the ARQ information present in the header of the packet relates only to the data field of the packet. In a simultaneous voice-data connection, both the voice and combined voice-data packets or bursts can be transmitted on demand. If data traffic is temporarily not available (due to the asynchronous nature of the data being transmitted), the voice bursts that provide the higher quality speech transmissions can be used. The voice payload in the voice burst can, for example, be stronger protected by FEC bits, or by using more powerful voice source coding than in the combined voice-data burst, where the (fixed-size) payload has to be divided between voice and data. By using an automatic transmit scheme where voice bursts are applied when no data is available (thus taking into account the "bursty" nature of data), a higher speech quality is experienced. Preferably, the type of burst being transmitted is indicated in the header (e.g., voice or data), so the receiving equipment can decide how and where to route the information received.

Alternatively, if neither speech nor data information is available for transmission, but bursts are being received that require some form of acknowledgment, a reduced-size burst may be returned that contains only a header. In addition to containing ARQ information, this header can also contain certain link-related information, such as, for example, the addresses of the source and destination terminal equipment. In the event that voice bursts are returned, they can contain ARQ information in the header that describes the status of the data in the received bursts. Consequently, both voice and combined voice-data bursts or packets may be mixed and transmitted without affecting the ARQ scheme used in the data transfer (no matter in what direction the transfer occurs).

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for simultaneously communicating voice information and data between a first terminal and a second terminal in a short-range wireless communications system, comprising the steps of:

defining a repetitive frame of predetermined time duration;

dividing the repetitive frame into a plurality of time slots;

in a first time slot of a first said frame, transmitting from one of the first and second terminals directly to the other of the first and second terminals a first quantity of voice information produced at the one terminal in response to a voice stimulus provided at the one terminal by a voice-sending party operating the one terminal, and the other terminal receiving the first quantity of voice information directly from the one terminal and reproducing therefrom the voice stimulus to be heard by a voice-receiving party operating the other terminal; and communicating data directly between the first and second terminals simultaneously with the communication of voice information directly between the first and second terminals, including, in a second time slot of said first frame, transmitting a first quantity of data from one of the first and second terminals directly to the other of the first and second terminals, and the other terminal receiving the first quantity of data directly from the one terminal.

2. The method according to claim 1, further comprising the step of transmitting a second quantity of voice information from the second terminal to the first terminal in a third time slot of said first frame.

3. The method according to claim 1, further comprising the step of transmitting a second quantity of data from the second terminal to the first terminal in a third time slot of said first frame.

4. The method according to claim 1, wherein said second time slot comprises a reception time slot for said second terminal.

5. The method according to claim 1, wherein said first quantity of voice information comprises digitally encoded speech information.

6. The method according to claim 1, wherein said first quantity of data comprises a packet of data.

7. The method according to claim 3, further comprising the steps of:
assembling data for transmission from said second terminal to said first terminal into a packet, said packet including a packet number and acknowledgment code indicative of packets previously received at said second terminal; and
transmitting said packet for reception by said first terminal using said third time slot.

8. The method according to claim 7, wherein said third time slot comprises a reception time slot for said first terminal.

9. The method of according to claim 1, wherein said first quantity of data further comprises combined voice information and data.

10. The method according to claim 3, wherein said second quantity of data further comprises combined voice information and data.

11. The method according to claim 9, wherein said combined voice information and data comprises voice information when data is unavailable.

12. The method according to claim 10, wherein said combined voice information and data comprises voice information when data is unavailable.

13. A method for retransmitting erroneous voice information and data between a first terminal and a second terminal in a short-range wireless radio communications system, comprising the steps of:
defining a repetitive frame of predetermined time duration;
dividing the repetitive frame into a plurality of time slots;
in a first time slot of a first said frame, transmitting from the first terminal directly to the second terminal a first quantity of voice information produced at the first terminal in response to a voice stimulus provided at the first terminal by a voice-sending party operating the first terminal, the second terminal receiving the first quantity of voice information directly from the first terminal and reproducing therefrom the voice stimulus to be heard by a voice-receiving party operating the second terminal;
communicating data directly between the first and second terminals simultaneously with the communication of voice information directly between the first and second terminals, including, in a second time slot of said first frame, transmitting a first quantity of data from the first terminal directly to the second terminal, the second terminal receiving the first quantity of data directly from the first terminal;
upon detection at the second terminal of an erroneous payload in at least one of said first quantity of voice information and said first quantity of data, transmitting an error indication and said payload from the second terminal to the first terminal in a third time slot of said first time frame; and
retransmitting said at least one of said first quantity of voice information and said first quantity of data in a time slot of a second said frame.

14. A method for permitting a first terminal to simultaneously communicate with a plurality of other terminals in a short-range wireless radio communications system, comprising the steps of:
defining a repetitive frame of predetermined time duration;
dividing the repetitive frame into a plurality of time slots;
selecting a first time slot of a first said frame for the first terminal to transmit data directly to one of the other terminals;
selecting a second time slot of said first frame for the first terminal to receive directly from one of the other terminals voice information that is produced at the one other terminal in response to a voice stimulus which is provided at the one other terminal by a voice-sending party operating the one other terminal, and which voice stimulus is to be reproduced from the voice information by the first terminal and heard by a voice-receiving party operating the first terminal;
selecting said second time slot independently of said first time slot;
selecting a first frequency for transmitting in said first time slot;
selecting a second frequency for receiving in said second time slot; and
selecting said second frequency independently of said first frequency.

15. The method according to claim 14, wherein said second frequency comprises said first frequency.

16. The method according to claim 14, wherein the communications system comprises a simplex system.

17. The method according to claim 14, wherein said time slots are randomly selected.

18. The method according to claim 14, wherein the step of selecting a first time slot further comprises the step of selecting N time slots for the first terminal to transmit voice or data information to N terminals of the plurality of other terminals.

19. The method according to claim 14, wherein the step of selecting a second time slot further comprises the step of selecting N time slots for the first terminal to receive voice or data information from N terminals of the plurality of other terminals.

20. The method according to claim 14, wherein said first and second frequencies are randomly selected.

21. The method according to claim 20, wherein said first and second frequencies are selected using a random number generator including an encryption key to hinder interception or jamming of the voice or data information.

22. The method according to claim 14, wherein said second time slot is selected orthogonally to said first time slot.

23. A terminal for communicating with other terminals in a short-range wireless radio communications system, comprising:
a resource allocation section operable to define a repetitive frame of predetermined time duration and divide the repetitive frame into a plurality of time slots;

a transmitting section operable to transmit a first quantity of data directly to one of the other terminals in a first time slot of a first said frame; and a receiving section operable to receive directly from one of the other terminals in a second time slot of said first frame a first quantity of voice information produced at the one other terminal in response to a voice stimulus provided at the one other terminal by a voice-sending party operating the one other terminal, and said receiving section further operable to reproduce from the first quantity of voice information the voice stimulus to be heard by a voice-receiving party operating the terminal.

24. The terminal according to claim 23, wherein said resource allocation section is operable to select a first time slot during which said transmitting section can transmit at least one of voice and data information, and a second time slot during which said receiving section can receive at least one of voice and data information, said second time slot selected independently of said first time slot.

25. The terminal according to claim 24, wherein said resource allocation section includes a random number generator operable to randomly select said first and second time slots.

26. The terminal according to claim 24, wherein said resource allocation section further comprises:

a random number generator;

an orthogonal offset generator;

a mixer coupled to an output of said random number generator and an output of said orthogonal offset generator; and a memory section coupled to an output of said mixer, said memory section operable to map an output signal from said mixer to a memory location containing one of said time slots.

27. The terminal according to claim 26, wherein said output signal is an orthogonally offset random number.

28. The terminal according to claim 26, wherein said memory section further comprises a two-dimensional array, said memory section operable to map an output signal from said mixer to at least one of two memory locations, a first of said locations containing a frequency and a second of said locations containing a time slot.

29. The terminal according to claim 27, wherein a plurality of rows in said memory comprises a plurality of time slots, and a plurality of columns in said memory comprises a plurality of frequencies.

* * * * *